(12) United States Patent
Shinonaga

(10) Patent No.: US 7,755,538 B2
(45) Date of Patent: Jul. 13, 2010

(54) RADAR APPARATUS

(75) Inventor: Mitsuyoshi Shinonaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/465,191

(22) Filed: May 13, 2009

(65) Prior Publication Data

US 2010/0045509 A1    Feb. 25, 2010

(30) Foreign Application Priority Data

Aug. 25, 2008    (JP)    ............... 2008-215413

(51) Int. Cl.
*G01S 13/00*    (2006.01)
(52) U.S. Cl. .................. 342/160; 342/162; 342/82; 342/137
(58) Field of Classification Search ......... 342/159–162, 342/200–204, 82, 137
See application file for complete search history.

(56) References Cited

U.S. PATENT DOCUMENTS

| | | | | |
|---|---|---|---|---|
| 2,989,742 | A * | 6/1961 | Johnson et al. | ............. 342/164 |
| 3,281,840 | A * | 10/1966 | Feten | ............. 342/160 |
| 3,696,415 | A * | 10/1972 | Ballantyne | ............. 342/197 |
| 3,882,495 | A * | 5/1975 | Bolger | ............. 342/189 |
| 4,908,628 | A * | 3/1990 | Cashen et al. | ............. 342/134 |
| 5,920,279 | A * | 7/1999 | Andersson | ............. 342/59 |
| 6,064,333 | A * | 5/2000 | Stromberg | ............. 342/81 |
| 7,030,807 | B2 * | 4/2006 | Yokoo et al. | ............. 342/135 |
| 7,466,261 | B1 * | 12/2008 | Hoctor et al. | ............. 342/137 |

(Continued)

FOREIGN PATENT DOCUMENTS

JP    05126943 A   *   5/1993

(Continued)

OTHER PUBLICATIONS

Byron Edde, "Radar Signal Processing II: Moving Target Indicators and Doppler Processing", Radar: Principles, Technology, Applications, Chap. 12, 1993, 16 pages.

(Continued)

*Primary Examiner*—John B Sotomayor
(74) *Attorney, Agent, or Firm*—Oblon, Spivak, McClelland, Maier & Neustadt, L.L.P.

(57) ABSTRACT

The present invention provides a radar apparatus including: a transmission pulse group generator configured to generate: a first transmission pulse group from a first transmission pulse train formed of N first transmission pulses (N>2, where N is an integer number) having constant first time intervals t1, by thinning a first transmission pulse out of the first transmission pulse train so that all the intervals ranging from t1 to (N−1)*t1 are held by pairs of first transmission pulses selected from the first transmission pulse group; and a second transmission pulse group from a second transmission pulse train formed of M second transmission pulses (M>2, where M is an integer number) having second time intervals t2 different from the first time intervals t1, by thinning a second transmission pulse out of the second transmission pulse train so that all time intervals ranging from t2 to (M−1)*t2 are held by pairs of second transmission pulses selected from the second transmission pulse group. The radar apparatus also includes a transmitter configured to transmit the first transmission pulse group and the second transmission pulse group in a way that the first and second transmission pulse groups partially or entirely overlap each other in terms of time.

5 Claims, 8 Drawing Sheets

U.S. PATENT DOCUMENTS

2010/0045509 A1 * 2/2010 Shinonaga .................. 342/160

FOREIGN PATENT DOCUMENTS

JP        2611654        2/1997
JP        09236656 A  *  9/1997

OTHER PUBLICATIONS

Merrill Ivan Skolnik, "MTI and Pulse Doppler Radar", Introduction to Radar Systems, Chap. 4, 1980, 16 pages.

Frederic Barbaresco, "Intelligent Multi-mission Radar Resources Management", 2008 IEEE Radar Conference, Tutorial, May 30, 2008, 6 pages.

* cited by examiner

RADAR APPARATUS

TECHNICAL FIELD

The present invention relates to a radar apparatus configured to detect a target, and more specifically, to a technique for improving Doppler frequency resolution.

The present invention is applied based on the previous application filed with Japanese Patent Office under the application number P2008-215413, dated on Aug. 25, 2008.

BACKGROUND ART

Moving target detection processing is known as standard processing of a radar apparatus. Since a radar received echo includes a target reflection signal and unnecessary reflection signals (which are called clutter) from grounds and the like, this moving target detection processing is for suppressing the clutter by discriminating the target reflection signal from the clutter on the basis of the moving speed of a target. Here, a filtering process is performed on Doppler frequencies generated in relation to the moving speed of the target.

Typical examples of this filtering process for the Doppler frequencies include MTI, FFT, and the like. However, in order to obtain a signal process gain by this Doppler filtering process, a transmission frequency at the time of receiving a signal used for the Doppler filtering process must be coherent (i.e., phase-continuous at the same frequency) and transmission pulse intervals must be constant.

Meanwhile, a target search by the radar is performed by sequentially transmitting transmission pulses to a necessary range all around an antenna while rotating the antenna. Because the antenna is rotated, a time period for irradiating an intended target with the transmission radio waves is limited. The number of transmission pulses to be transmitted within this irradiation period is called a hit number. The above-described Doppler filtering process is performed on transmission pulses within a time period called a CPI (coherent processing interval) having this hit number as an upper limit, or in other words, on the same number of received echoes.

As described above, in a certain number of transmission pulses known as the CPI, the transmission frequency needs to be constant and the transmission pulse intervals also need to be constant. However, as a result of processing such transmission pluses through the filtering process for suppressing the clutter, there occurs a problem of having a speed range where it is impossible to detect the target (which is called blind speed) (see FIGS. 12-15 and 16 in Non Patent Literature 1, and FIG. 4.16 (a) and (b) in Non Patent Literature 2).

To solve this, a technique called staggering for eliminating the blind speed by sequentially transmitting multiple CPIs having different transmission pulse intervals has been generally employed (see FIGS. 12-17 in Non Patent Literature 1 and FIG. 4.16 (c) in Non Patent Literature 2).

Here, Patent Literature 1 discloses a conventional technique concerning the above-described measure. A radar signal processing apparatus disclosed in this Patent Literature 1 includes: a MTI map generator configured to set up an MTI map in a fixed clutter region; an automatic clutter map generator configured to set up an automatic clutter map in a moving clutter region by use of an inputted video signal; a synchronizer configured to output trigger pulses for defining a staggering cycle, the trigger pulses having sampling intervals determined at least based on a Doppler characteristic of a target and on a hit number; a filtering coefficient controller configured to receive the MTI map, the automatic clutter map, and the trigger pulses and to output a predetermined different filtering coefficient in response to each of the trigger pulses; multiple filters set to have filtering characteristics based on the predetermined filtering coefficient outputted from the filtering coefficient controller; multiple clutter suppressors configured to perform clutter suppression processing on outputs from the multiple filters; and a greatest value selector configured to select the greatest value among outputs from the multiple clutter suppressors. The greatest value selector receives an output signal from the predetermined filter which is different for each trigger pulse, selects the greatest output signal, and synthesizes a radar signal to be outputted. In short, the radar signal processing apparatus reduces an influence of MTI blindness in the multiple CPIs having different transmission pulse intervals by appropriately changing coefficients for Doppler filter banks for the CPIs. In this way, it is possible to obtain a target signal at a high detection probability.

As a technique related to the conventional technique, Non Patent Literature 3 discloses a technique for the thinning-out of the transmission pulses to be described later, for example. Non Patent Literature 3 discloses that it is possible to form Doppler filter banks even when a certain number of pulses are thinned out of a transmission pulse train with constant intervals. According to Non Patent Literature 3, use of thinned-out transmission pulse trains for tracking the respective targets enables tracking of multiple targets at the same time, and thereby reduces necessary time.

CITATION LIST

Patent Literature 1
Japanese Patent No. 2611654
Non Patent Literature 1
"Radar; principles, technology, applications, chap. 12", B. Edde, 1993 (Prentice Hall)
Non Patent Literature 2
"Introduction to Radar Systems, chap. 4", M. I. Skolnik, 1980 (McGraw-Hill)
Non Patent Literature 3
"Intelligent Multi-mission Radar Management", F. Barbaresco, 2008 IEEE Radar Conference, Tutorial However, a conventional radar apparatus at least requires a certain number of transmission pulses even in the case of carrying out the Doppler filtering process to suppress the clutter. Accordingly, it is difficult to set up multiple CPIs when the hit number is extremely limited.

For example, when the hit number is eight as shown in FIG. 1 (in which pulses in the drawing indicate the transmission pulses and received echoes are received between the transmission pulses), and also when the CPIs are formed to have different transmission pulse intervals, it is only possible to sequentially transmit two CPIs (CPI1 and CPI2) each having four pulses at the maximum.

Specifically, the Doppler frequency resolution is degraded because the number of pulses included in one CPI is small and a length of the CPI (duration) is short. Accordingly, this Doppler filtering process using these CPIs has a limited performance.

SUMMARY OF INVENTION

Technical Problem

An object of the present invention is to provide a radar apparatus which is capable of effectively setting up multiple CPIs even when a hit number is limited.

Solution of Problem

The present invention provides a radar apparatus which includes a transmission pulse group generator configured to generate: a first transmission pulse group from a first transmission pulse train formed of N first transmission pulses (N>2, where N is an integer number) having constant first time intervals t1, by thinning a first transmission pulse out of the first transmission pulse train so that all time intervals ranging from t1 to (N−1)*t1 are held by pairs of first transmission pulses selected from the first transmission pulse group; and a second transmission pulse group from a second transmission pulse train formed of M second transmission pulses (M>2, where M is an integer number) having second time intervals t2 different from the first time intervals t1, by thinning a second transmission pulse out of the second transmission pulse train so that all time intervals ranging from t2 to (M−1)*t2 are held by pairs of second transmission pulses selected from the second transmission pulse group. The radar apparatus also includes a transmitter configured to transmit the first transmission pulse group and the second transmission pulse group in an identical direction in a way that the first and second transmission pulse groups partially or entirely overlap each other in terms of time.

ADVANTAGEOUS EFFECTS OF INVENTION

According to the present invention, the transmission pulse group generator generates: a first transmission pulse group from a first transmission pulse train formed of N transmission pulses (N>2, where N is an integer number) having constant first time intervals t1, by thinning a transmission pulse out of the first transmission pulse train so that all the time intervals ranging from t1 to (N−1)*t1 are held by pairs of transmission pulses selected from the first transmission pulse group; and a second transmission pulse group from a second transmission pulse train formed of M transmission pulses (M>2, where M is an integer number) having second time intervals t2 different from the first time intervals t1, by thinning a transmission pulse out of the second transmission pulse train so that all the time intervals ranging from t2 to (M−1)*t2 are held by pairs of transmission pulses selected from the second transmission pulse group. The transmitter transmits the first transmission pulse group and the second transmission pulse group in an identical direction in a way that the first and second transmission pulse groups partially or entirely overlap each other in terms of time.

Specifically, some of the transmission pulses are thinned out from the two types of continuous first and second transmission pulse trains having different pulse intervals. Then, both of the transmission pulse trains are overlapped one another while maintaining predetermined intervals so as not to cause troubles in the transmission and reception of the pulse trains. Then, the two types of the transmission pulse trains originally having the different pulse intervals are combined and transmitted at the same time in the form of overlapped transmission pulse trains. Therefore, it is possible to provide a radar apparatus which is capable of effectively setting up multiple CPIs even when a hit number is limited.

DESCRIPTION OF EMBODIMENTS

Examples

Now, a radar apparatus according to an embodiment of the present invention will be described below in detail with reference to the accompanying drawings.

Example 1

Figure 1:
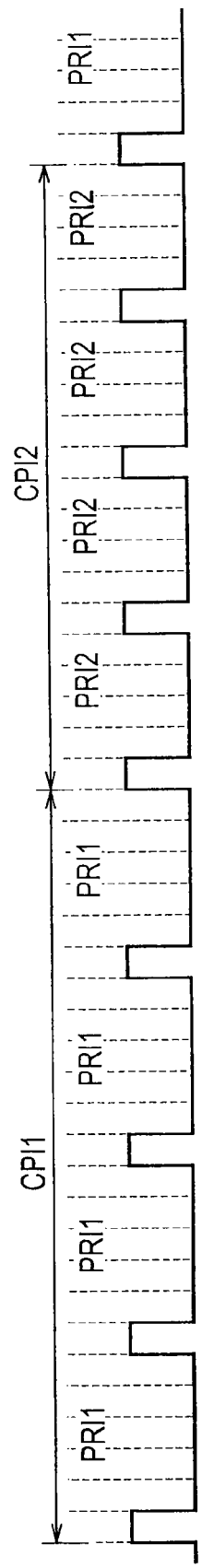
FIG. 1 is a view showing a transmission pulse train of a conventional radar apparatus.
Figure 2:
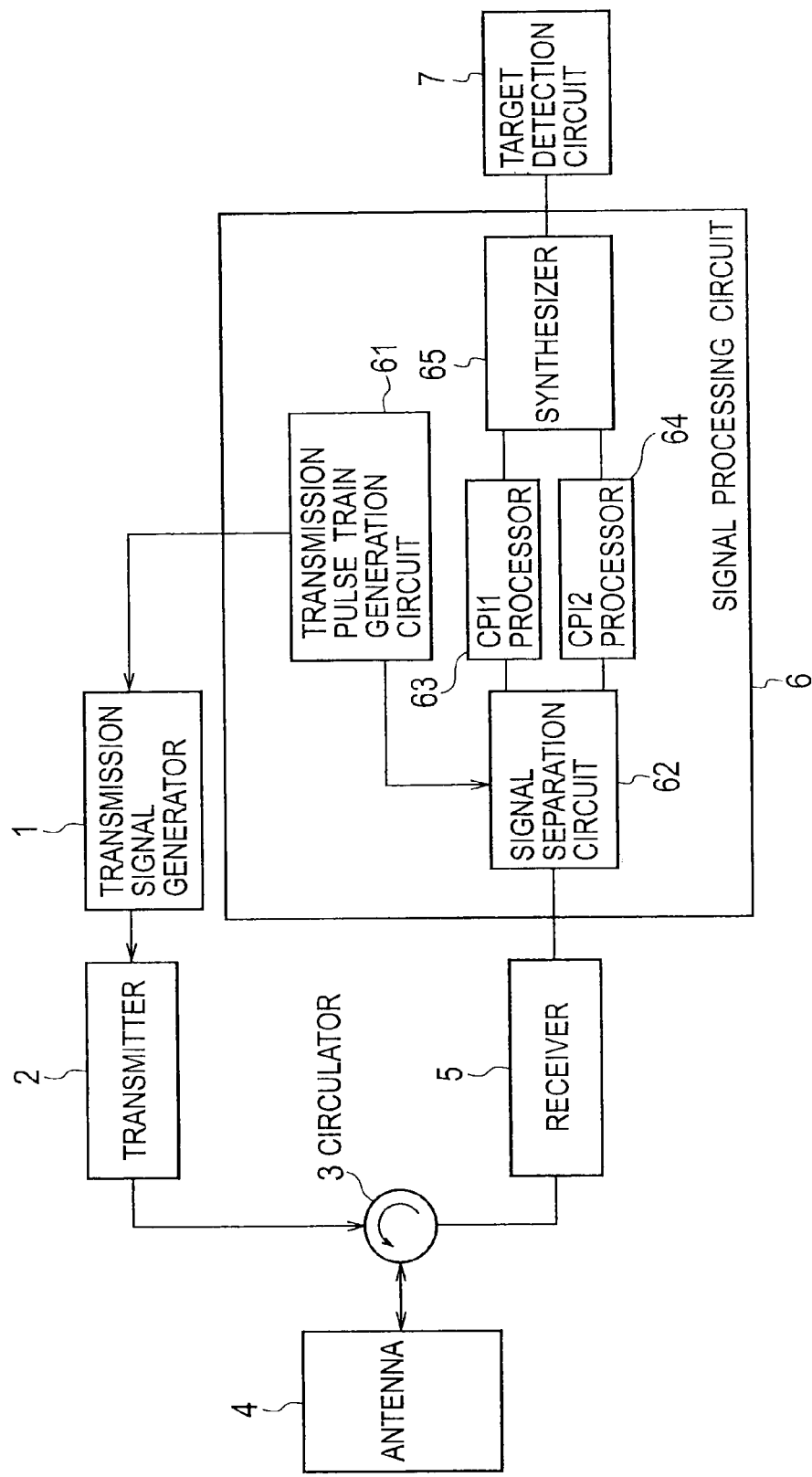
FIG. 2 is a block diagram showing a configuration of a radar apparatus according to Example 1 of the present invention.

FIG. 2 is a block diagram showing a configuration of a radar apparatus according to Example 1 of the present invention. This radar apparatus includes a transmission signal generator 1, a transmitter 2, a circulator 3, an antenna 4, a receiver 5, a signal processing circuit 6, and a target detection circuit 7.

This radar apparatus is configured: to thin out some of transmission pulses from two types of continuous first and second transmission pulse trains that have different pulse intervals; to overlap the transmission pulse trains on one another in a way to maintain predetermined intervals between pulses of the two trains so as not to cause troubles in transmission and reception thereof; and then to combine and transmit the two types of the transmission pulse trains originally having the different pulse intervals at the same time in the form of the overlapped transmission pulse train.

The transmitter 2 amplifies a transmission signal from the transmission signal generator 1. The transmission signal amplified by the transmitter 2 is sent to the antenna 4 through the circulator 3 and is then radiated from the antenna 4 to an open space as a transmission wave.

The transmission wave radiated from the antenna 4 to the open space is reflected by a target and then inputted to the antenna 4. The antenna converts the reflected wave thus inputted into an electric signal and sends the electric signal to the receiver 5 through the circulator 3.

The receiver 5 includes a high-frequency amplification circuit, a frequency conversion circuit, and an A/D conversion circuit (none of them are illustrated). The receiver 5 amplifies the signal sent from the antenna 4 through the circulator 3 by use of the high-frequency amplification circuit, converts the signal into an intermediate frequency signal (IF) by use of the frequency conversion circuit, converts the intermediate frequency signal into a digital signal by use of the A/D conversion circuit, and then sends the digital signal to the signal processing circuit 6 as a reception signal.

The signal processing circuit 6 subjects the reception signal sent from the receiver 5 to Doppler frequency processing (corresponding to conventional MTI processing or FFT processing, for example) and then outputs a result. The signal processing circuit 6 includes a transmission pulse train generation circuit 61, a signal separation circuit 62, a CPI1 processor 63, a CPI2 processor 64, and a synthesizer 65.

Figure 3:
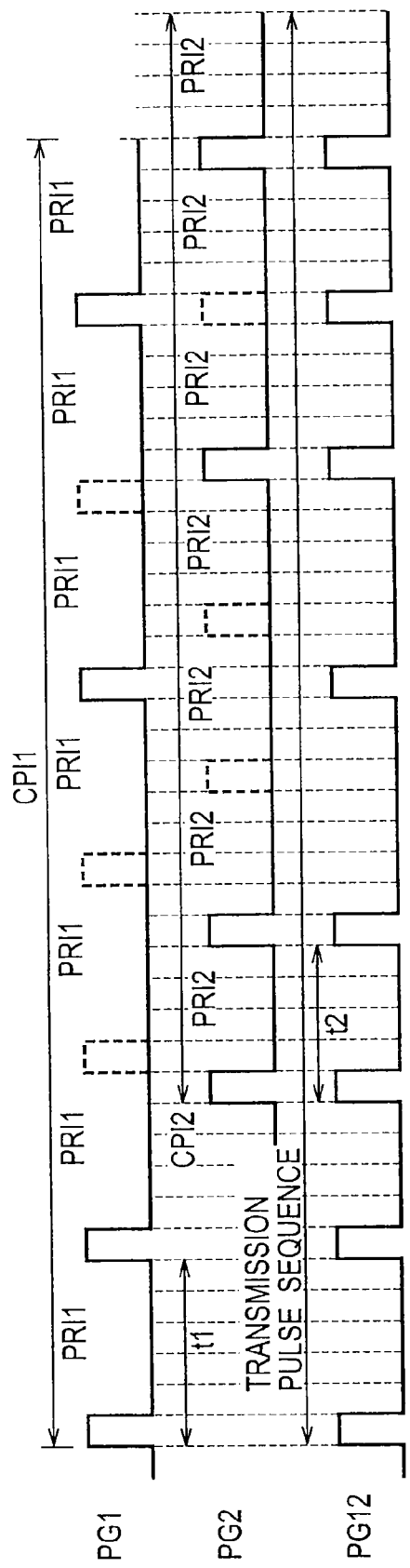
FIG. 3 is a view showing a transmission pulse train of the radar apparatus according to Example 1 of the present invention.

The transmission pulse train generation circuit 61 corresponds to a transmission pulse group generator of the present invention. The transmission pulse train generation circuit 61 generates a first transmission pulse group PG1 and a second transmission pulse group PG2 and outputs the groups PG1 and PG2 to the transmission signal generator 1. As shown in FIG. 3, the first transmission pulse group PG1 is generated from a first transmission pulse train CPI1 formed of N first transmission pulses (seven pulses, for example) having constant first time intervals t1, by thinning, for example, three first transmission pulses out of the first transmission pulse train CPI1 so that all the time intervals ranging from t1 to (N−1)*t1 are held by pairs of first transmission pulses selected from the first transmission pulse group PG1. In addition, the second transmission pulse group PG2 is generated from a second transmission pulse train CPI2 formed of M second transmission pulses (seven pulses, for example) having second time intervals t2 that are different from the first time intervals t1, by thinning, for example, three second transmission pulses out of the second transmission pulse train CPI2 so that all the time intervals ranging from t2 to (M−1)*t2 are held by pairs of second transmission pulses selected from the second transmission pulse group PG2.

The transmission signal generator 1 corresponds to a transmitter of the present invention. Based on the first transmission pulse group PG1 and the second transmission pulse group PG2 from the transmission pulse train generation circuit 61, the transmission signal generator 1 generates a transmission signal formed of a transmission pulse sequence PG12 (shown in FIG. 3) so that the first transmission pulse group PG1 and the second transmission pulse group PG2 partially or entirely overlap one another in terms of time in transmission in the same direction.

Figure 5:
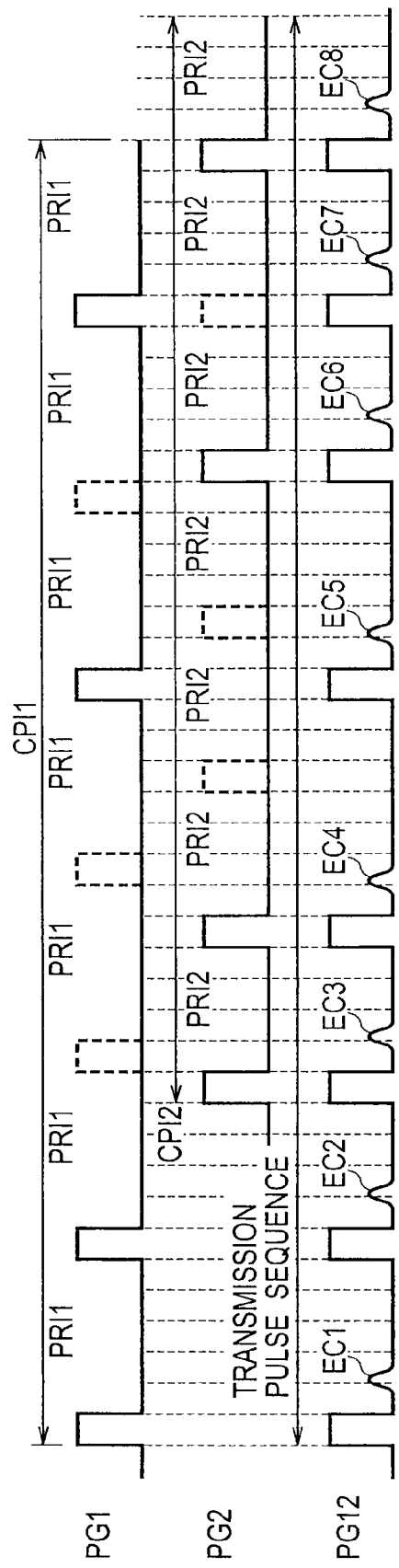
FIG. 5 is a view showing received echoes in response to transmission of the transmission pulse train of the radar apparatus according to Example 1 of the present invention.

The signal separation circuit 62 separates reception signal from the receiver 5, i.e., received echoes EC1 to EC8 as shown in FIG. 5 into the first transmission pulse group PG1 and the second transmission pulse group PG2 based on the first transmission pulse group PG1 and the second transmission pulse group PG2 from the transmission pulse train generation circuit 61.

The CPI1 processor 63 corresponds to a calculator of the present invention, which is configured to calculate power spectrum distribution for each Doppler frequency based on the received echoes for the first transmission pulse group PG1 separated by the signal separation circuit 62. The CPI2 processor 64 also corresponds to the calculator of the present invention, which is configured to calculate power spectrum distribution for each Doppler frequency based on the received echoes for the second transmission pulse group PG2 separated by the signal separation circuit 62. The synthesizer 65 synthesizes the power spectrum distribution for the Doppler frequencies calculated by the CPI1 processor 63 and the power spectrum distribution for the Doppler frequencies calculated by the CPI2 processor 64, and then outputs the synthesized power spectrum distribution to the target detection circuit 7.

The target detection circuit 7 detects a moving target by use of the power spectrum distribution calculated by the synthesizer 65 and outputs a target detection signal.

Next, operations of the radar apparatus of Example 1 will be described with reference to FIG. 3. FIG. 3 shows the first transmission pulse train, the second transmission pulse train, the first transmission pulse group PG1, the second transmission pulse group PG2, and the transmission pulse sequence PG12 that is to be actually transmitted.

Specifically, transmission pulses indicated with a solid line in CPI1 represent the first transmission pulse group PG1 and the combination of the transmission pulses indicated with the solid line and transmission pulses indicated with a dotted line represent the first transmission pulse train. Transmission pulses indicated with a solid line in CPI2 represent the second transmission pulse group PG2 and the combination of the transmission pulses indicated with the solid line and transmission pulses indicated with a dotted line represent the second transmission pulse train.

In this example, both of the first transmission pulse train and the second transmission pulse train are formed of the same number of pulses (N=7, M=7). However, the present invention is not limited only to this configuration.

As shown in FIG. 3, each of the first transmission pulse group PG1 and the second transmission pulse group PG2 is formed by thinning some transmission pulses out of the first transmission pulse train and the second transmission pulse train. Meanwhile, each of transmission pulse interval is set to a constant interval (PRI1 (pulse repeat interval) and PRI2) and an integral multiple of that interval. That is, the transmission pulse interval of the first transmission pulse group PG1 is different from the transmission pulse interval of the second transmission pulse group PG2.

Figure 4:
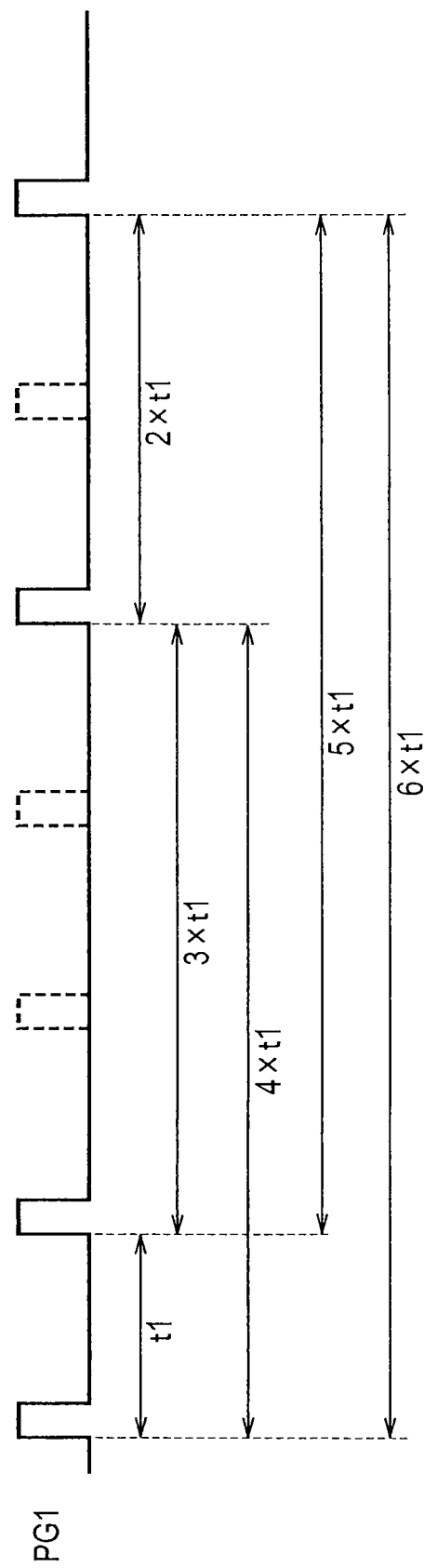
FIG. 4 is a view showing a transmission pulse group generated by thinning transmission pulses out of the transmission pulse train so as to contain all time intervals, by using the radar apparatus according to Example 1 of the present invention.

FIG. 4 is a view showing the transmission pulse group generated by thinning transmission pulses out of the transmission pulse train so as to contain all the time intervals by use of the radar apparatus of Example 1. Specifically, in FIG. 4, the first transmission pulse group PG1 is formed by thinning thee transmission pulses out of the first transmission pulse train CPI1 so as to contain all the time intervals of t1, 2*t1, 3*t1, 4*t1, 5*t1, and 6*t1 when selecting two transmission pulses from the first transmission pulse train CPI1. Note that the method of thinning out the second transmission pulse group PG2 is similar to the method of thinning out the first transmission pulse group PG1.

It is possible to apply a conventional Doppler filtering process to the first and second transmission pulse groups PG1 and PG2 thus thinned out. However, it is known that the conventional Doppler filtering process brings about a considerable adverse effect of thinning out because this process does not assume the operation to thin out.

On the other hand, in order to reduce such an adverse effect, there is known a method of calculating an autocorrelation function by using a thinned received-signal and then subjecting a result of this calculation to Fourier transform so that a power spectrum relative to the Doppler frequency is calculated.

Nevertheless, to apply this method, it is essential that a transmission pulse group after thinned out includes at least one pulse pair having each of all the intervals ranging from a minimum interval (PRI1 or PRI2) to (N−1 (or M−1)) times of the minimum interval. Both of the transmission pulse groups PG1 and PG2 shown in FIG. 3 satisfy this prerequisite.

Moreover, by the thinning out as described above, it is possible to obtain sufficient length (duration) of the CPI and to improve the Doppler frequency resolution even with a small number of pulses, as compared to the case of continuously transmitting and receiving the same number of pulses. Accordingly, a signal/noise (S/N) ratio after the Doppler filtering process is improved.

Further, as the transmission pulse trains are thinned out, it is possible to appropriately overlap the first and second transmission pulse groups PG1 and PG2 with each other as shown in FIG. 3 so as not to cause troubles in transmitting and receiving both the pulse groups. Hence, it is apparent that the pulse trains having two types of transmission intervals can be transmitted at the same time.

The transmission pulse sequence PGI2 in FIG. 3 shows that it is possible to overlap the first transmission pulse group PG1 and the second transmission pulse group PG2 one another, each of which are equivalent to seven pulses, within a period required for transmitting eight pulses (two CPIs each having four pulses) in conventional practices.

Specifically, instead of cramming multiple CPIs formed of continuous transmission pulse trains by dividing the hit number, the two CPIs are formed at the same time so as to overlap each other throughout the original hit number. Accordingly, it is possible to improve the Doppler frequency resolution and to improve the S/N ratio as compared to the case of dividing the CPIs in terms of time.

Meanwhile, the signal separation circuit 62 separates the received echoes EC1 to EC8 that are sequentially inputted as shown in FIG. 5, based on time information on the pulses of the first transmission pulse group PG1 and of the second transmission pulse group PG2 provided from the transmission pulse train generation circuit 61. Among these received echoes, the signal separation circuit 62 separates the received echoes EC1, EC2, EC5, and EC7 as the first transmission pulse group PG1 while separates the received echoes EC3, EC4, EC6, and EC8 as the second transmission pulse group PG2.

The CPI1 processor 63 calculates power spectrum distribution for each of the Doppler frequencies based on the received echoes EC1, EC2, EC5, and EC7 for the first transmission pulse group PG1. The CPI2 processor 64 calculates power spectrum distribution for each of the Doppler frequencies based on the received echoes EC3, EC4, EC6, and EC8 for the second transmission pulse group PG2. Specifically, it is possible to obtain the results for the different multiple transmission time intervals by carrying out the Doppler filtering process for each of the received echoes with respect to the first transmission pulse group PG1 and the second transmission pulse group PG2. Hence, it is also possible to eliminate the blind speed.

In this case, it is also possible to deal with a case of applying a method called frequency diversity which uses different transmission frequencies depending on the CPIs, by changing the transmission frequencies for the transmission pulse groups. Accordingly, the present invention has a high compatibility with the conventionally used diversity method.

As described above, the radar apparatus of Example 1 is configured: to thin some transmission pulses out of two types of continuous transmission pulse trains originally having the different pulse intervals; to overlap the pulse trains on one another while maintaining the minimum intervals so as not to cause troubles in transmission and reception of the pulse trains: and then to combine and transmit the two types of the transmission pulse trains originally having the different pulse intervals at the same time in the form of the overlapped transmission pulse trains. Therefore, even when a hit number is limited, it is possible to set up multiple CPIs effectively and to eliminate the blind speed effectively at the same time.

Example 2

Figure 6:
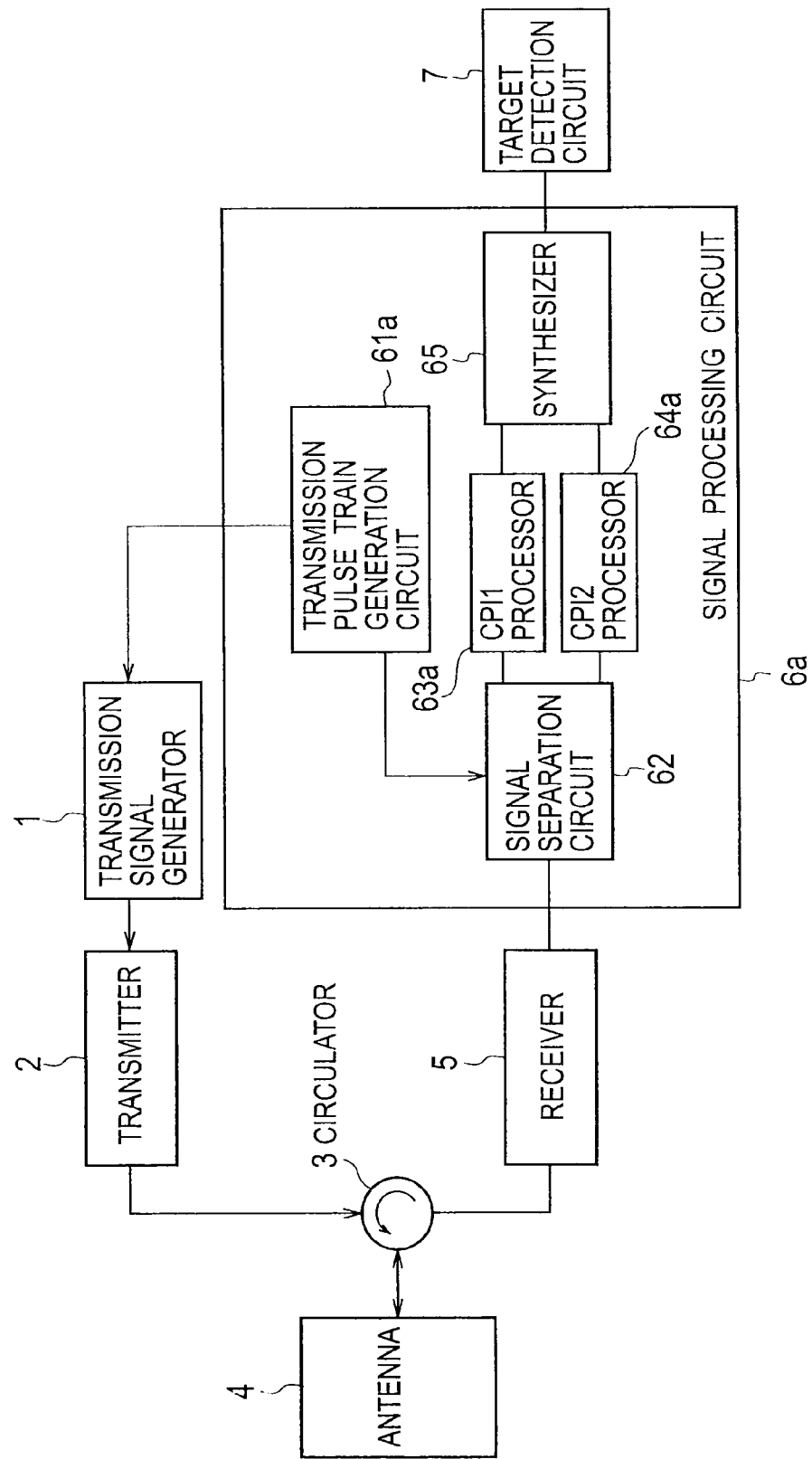
FIG. 6 is a block diagram showing a configuration of a radar apparatus according to Example 2 of the present invention.
Figure 7:
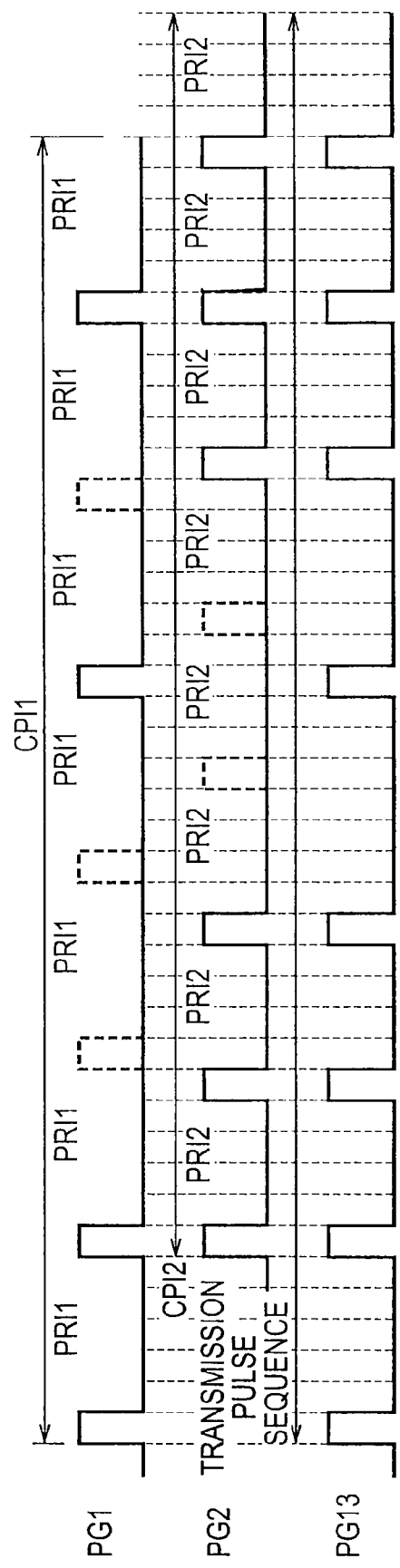
FIG. 7 is a view showing a transmission pulse train of the radar apparatus according to Example 2 of the present invention.
Figure 8:
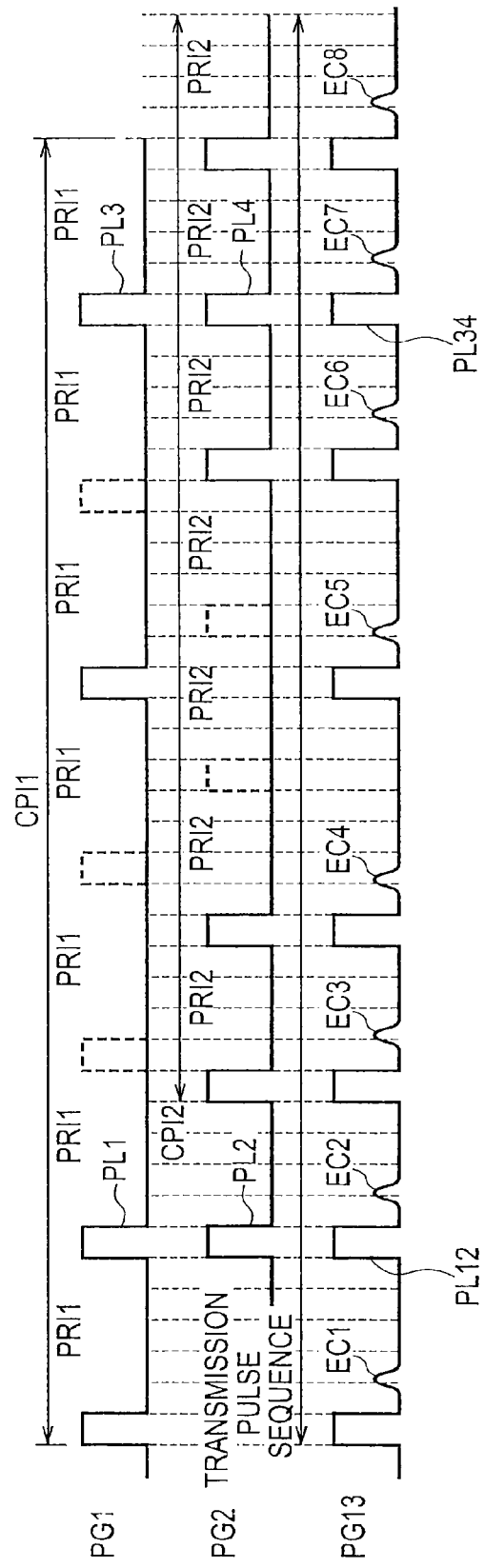
FIG. 8 is a view showing received echoes in response to transmission of the transmission pulse train of the radar apparatus according to Example 2 of the present invention.

FIG. 6 is a block diagram showing a configuration of a radar apparatus according to Example 2 of the present invention. FIG. 7 is a view showing an example of transmission pulse trains of the radar apparatus according to Example 2 of the present invention. FIG. 8 is a view showing received echoes in response to transmission of the exemplified transmission pulse trains of the radar apparatus according to Example 2 of the present invention.

The radar apparatus of Example 2 is configured to synchronize transmission pulse timing for any of a first transmission pulse group and of a second transmission pulse group by adjusting start time of these transmission pulse groups. The radar apparatus reduces the number of pulses that are thinned out by sharing received echoes between both of the transmission pulse groups. Here, it is also possible to directly reduce the number of transmission pulses in the case of combination.

The radar apparatus of Example 2 shown in FIG. 6 includes a transmission pulse train generation circuit 61a, a CPI1 processor 63a, and a CPI2 processor 64a in a signal processing circuit 6a, which are different from those included in the signal processing circuit 6 of the radar apparatus of Example 1 shown in FIG. 2.

The transmission pulse train generation circuit 61a has substantially similar functions as those of the transmission pulse train generation circuit 61. In addition, the transmission pulse train generation circuit 61a is configured to generate a first transmission pulse group PG1 and a second transmission pulse group PG2 which are synchronized with each other such that a transmission frequency of the first transmission pulse train and a transmission frequency of the second transmission pulse train are coherent and provided with the same transmission pulse waveform, and that, as shown in FIG. 8, pairs of transmission pulses PL1 and PL2 of the respective the first and second transmission pulse trains as well as PL3 and PL4 of the respective the first and second transmission pulse trains overlap one another in terms of time.

Based on the first transmission pulse group PG1 and the second transmission pulse group PG2 from the transmission pulse train generation circuit 61a, a transmission signal generator 1 generates a transmission signal formed of a transmission pulse sequence PG13 (shown in FIG. 7) so that the first transmission pulse group PG1 and the second transmission pulse group PG2 partially or entirely overlap one another in terms of time in transmission in the same direction.

A CPI1 processor 63a and a CPI2 processor 64a have substantially similar functions as those of the CPI1 processor 63 and the CPI2 processor 64. In addition, as shown in FIG. 8, each of the CPI1 processor 63a and the CPI2 processor 64a calculates power spectrum distributions by commonly using received echoes EC2 and EC7 for the synchronized pairs of transmission pulses PL1 and PL2 as well as PL3 and PL4 as the received echoes for the first transmission pulse group PG1 and the second transmission pulse group PG2.

Next, operations of the radar apparatus of Example 2 will be described more concretely. As shown in FIG. 7, it is possible to set up the transmission pulses shared by the first transmission pulse group PG1 and the second transmission pulse group PG2 in multiple positions, by selecting a relatively small integral ratio (for example, 6:5) between the two types of the transmission pulse intervals. In this case, it is also possible to further reduce the adverse effect attributable to the thinning out by increasing the number of the transmission pulse trains constituting the transmission pulse groups or by actively utilizing the shared received echoes.

FIG. 8 shows the same combination as FIG. 3, yet FIG. 3 is the case where three pulses are thinned out of each transmission pulse train having N=7. On the other hand, while FIG. 8 represents the same transmission sequence, the pairs of pulses PL1 and PL2 as well as PL3 and PL4 respectively share the two positions. For this reason, the first transmission pulse group PG1 is formed with three pulses thinned out and the second transmission pulse group PG2 is formed with two pulses thinned out, with respect to the CPI1 having N=7 and the CPI2 having M=8, respectively.

Moreover, the first transmission pulse group PG1 including four transmission pulses overlaps the second transmission pulse group PG2 including six transmission pulses, and, at the same time, the pairs of pulses PL1 and PL2 as well as PL3 and PL4 respectively share the two positions. In this way, the transmission pulse sequence PG13 including eight transmission pulses is produced as a consequence.

Specifically, instead of cramming multiple CPIs formed of continuous transmission pulse trains by dividing the hit number, the two CPIs are formed at the same time so as to overlap each other throughout the original hit number. Accordingly, it is possible to improve the Doppler frequency resolution and to improve the S/N ratio as compared to the case of dividing the CPIs in terms of time.

Moreover, the transmission pulse groups shown in FIG. 3 satisfy the prerequisite for the thinning out which is necessary for the above-described Doppler filtering process. Accordingly, the transmission pulse sequence that satisfies the prerequisite for allowing the same process is formed in this case.

Further, it is also possible to apply a sequence including seven pulses exclusive of the last pulse from the transmission pulse group PG2. In that case, as a consequence, the CPI1 is thinned out by three pulses from the transmission pulse sequence having N=7 while the CPI2 is thinned out by two pulses from the same transmission pulse sequence. Accordingly, it is also possible to form a transmission pulse sequence even in a shorter time period by overlapping two types of sequences having different transmission intervals.

The above Examples has described the system configured to detect a target after the synthesizer 65 synthesizes the outputs from the CPI1 processor 63 or 63a and the CPI2 processor 64 or 64a. However, it is not always necessary to synthesize the outputs. It is also possible to input the outputs directly to the target detection circuit 7.

Furthermore, regarding the method of synthesizing the two outputs, it is also possible to employ various other aspects such as provision of the target detection circuits 7 individually for the outputs from the CPI1 processor 63 or 63a and the CPI2 processor 64 or 64a.

INDUSTRIAL APPLICABILITY

The present invention is applicable to a target detection apparatus configured to detect a target.

REFERENCE SIGNS LIST

1 TRANSMISSION SIGNAL GENERATOR
2 TRANSMITTER
3 CIRCULATOR
4 ANTENNA
5 RECEIVER
6, 6a SIGNAL PROCESSING CIRCUIT
7 TARGET DETECTION CIRCUIT
61, 61a TRANSMISSION PULSE TRAIN GENERATION CIRCUIT
62 SIGNAL SEPARATION CIRCUIT
63, 63a CPI1 PROCESSOR
64, 64a CPI2 PROCESSOR
65 SYNTHESIZER

The invention claimed is:

1. A radar apparatus comprising:
    a transmission pulse group generator configured to generate
        a first transmission pulse group from a first transmission pulse train formed of N first transmission pulses (N>2, where N is an integer number) having constant first time intervals t1, by thinning a first transmission pulse out of the first transmission pulse train so that all time intervals ranging from t1 to (N−1)*t1 are held by pairs of first transmission pulses selected from the first transmission pulse group, and
        a second transmission pulse group from a second transmission pulse train formed of M second transmission pulses (M>2, where M is an integer number) having second time intervals t2 different from the first time intervals t1, by thinning a second transmission pulse out of the second transmission pulse train so that all time intervals ranging from t2 to (M−1)*t2 are held by pairs of second transmission pulses selected from the second transmission pulse group; and
    a transmitter configured to transmit the first transmission pulse group and the second transmission pulse group in an identical direction in a way that the first and second transmission pulse groups partially or entirely overlap each other in terms of time.

2. The radar apparatus according to claim 1, further comprising:
    a calculator configured to calculate power spectrum distribution for each Doppler frequency based on received echoes for the first transmission pulse group and to calculate power spectrum distribution for each Doppler frequency based on received echoes for the second transmission pulse group; and
    a target detection circuit configured to detect a moving target by use of both of the power spectrum distribution calculated by the calculator.

3. The radar apparatus according to claim 2, wherein a transmission frequency for the first transmission pulse group is different from a transmission frequency for the second transmission pulse group.

4. The radar apparatus according to claim 2,
    wherein a transmission frequency for the first transmission pulse train and a transmission frequency for the second transmission pulse train are coherent and have an identical transmission pulse waveform, and
    the first transmission pulse group and the second transmission pulse groups are synchronized with each other so that each of one or more pairs of transmission pulses of the first transmission pulse group and the second transmission pulse group unite each other in terms of time.

5. The radar apparatus according to claim 4, wherein the calculator calculates the power spectrum distribution by commonly using a received echo for each of the one or more pairs of synchronized transmission pulses as the received echo for the first transmission pulse group and the second transmission pulse group.

* * * * *